May 13, 1969

JAMES E. WEBB
ADMINISTRATOR OF THE NATIONAL AERONAUTICS
AND SPACE ADMINISTRATION
HIGH IMPACT PRESSURE REGULATOR
Filed Nov. 27, 1967

3,443,583

INVENTORS.
ALBERT TOPITS, JR.
ELMER L. FLOYD
JOHN E. BILES, JR.
BY J. E. Leslie
J. H. McCoy
ATTORNEYS.

United States Patent Office 3,443,583
Patented May 13, 1969

3,443,583
HIGH IMPACT PRESSURE REGULATOR
James E. Webb, Administrator of the National Aeronautics and Space Administration, with respect to an invention of Albert Topits, Jr., Altadena, Elmer L. Floyd, La Crescenta, and John E. Biles, Jr., Sierra Madre, Calif.
Filed Nov. 27, 1967, Ser. No. 685,787
Int. Cl. F16k *31/165, 41/00;* F01b *19/02*
U.S. Cl. 137—505.12                    2 Claims

ABSTRACT OF THE DISCLOSURE

An impact resistant pressure regulator having a minimum number of lightweight movable elements. The movable elements of the regulator are integrally connected to each other and to the regulator housing for reducing misalignment and damage to the regulator upon impact. The regulator contains two pressure chambers in fluid communication with each other. The entrance to each pressure chamber is valved and one wall of each pressure chamber comprises a thin metallic diaphragm. Each diaphragm is connected to the valved entrance and has a predetermined inherent biasing force so that when the pressure in each chamber overcomes the biasing force of the diaphragm the valved entrance to the respective chamber is closed. The diaphragms are the only biasing elements in the regulator.

Origin of the invention

Figure 1:
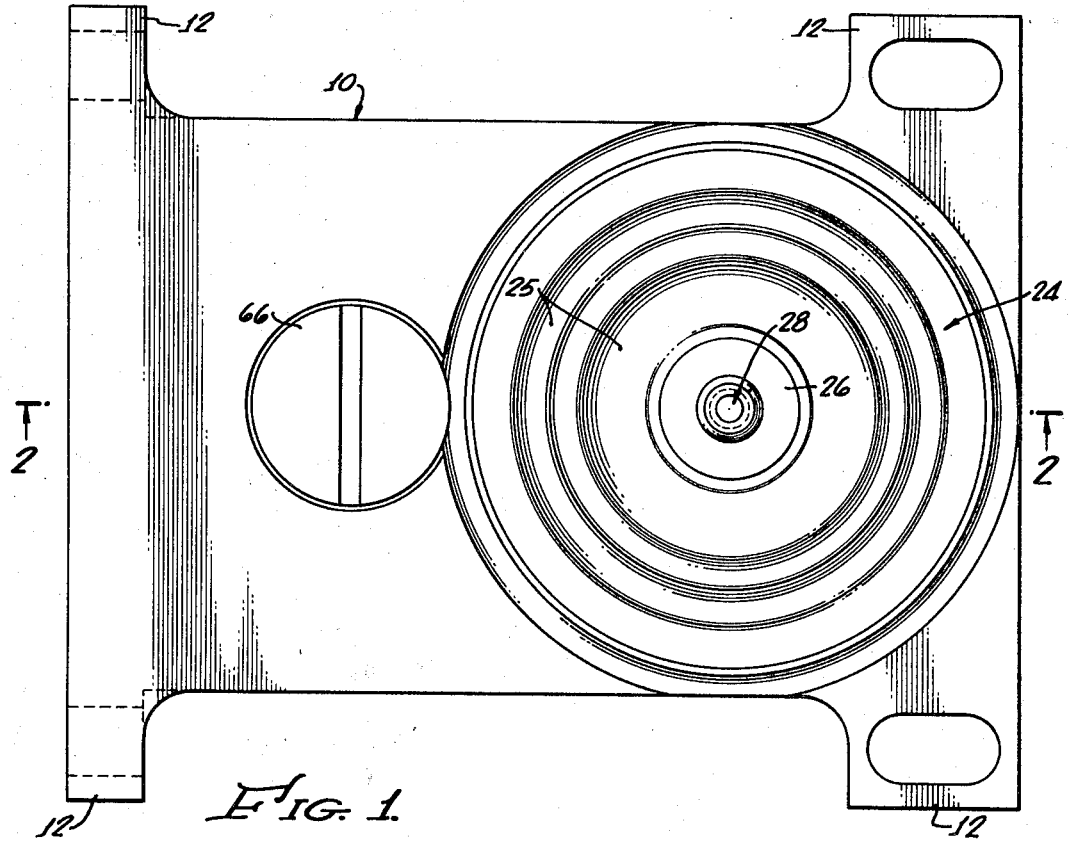

The invention described herein was made in the performance of work under a NASA contract and is subject to the provisions of Section 305 of the National Aeronautics and Space Act of 1958, Public Law 85–568 (72. Stat. 435; 42 USC 2457).

Background of invention

Existing two stage pressure regulators have been found to be unsatisfactory for use in high impact applications, such as in the hard landing systems of space vehicles and in impact scannographs, because they normally include several movable parts which have a high mass. At impact, the momentum of the movable portions of those regulators is so great that the yield strength of the movable parts is exceeded and they are permanently deformed or misaligned in the regulator. In particular many of these prior art multiple stage pressure regulators include coil spring biased diaphragms and encapsulating chambers for the coil spring. Normally such coil springs are positioned in their encapsulating chambers without being fixedly connected to the diaphragm so that at high impact the coil spring is jarred out of proper alignment thereby disrupting the regulator setting or completely ruining the regulator.

Summary of invention

This invention relates to a two stage step-down pressure regulator having a high impact resistance. The regulator includes a housing having a first stage pressure chamber therein. An inlet port in the housing connects the first stage chamber to a source of high pressure fluid. Fluid flow into the chamber is interruped by the regulator when the pressure in the chamber exceeds a predetermined level. This is accomplished by the use of a mechanism including a biasing member integrally connected to the housing and having a surface thereof communicating with the chamber. The first stage pressure chamber communicates with a second stage pressure chamber so that fluid flows from the first stage pressure chamber into the second. A second biasing member is included in a mechanism in the second stage chamber for interrupting fluid flow from the first stage chamber into the second stage chamber. The second biasing member is also integrally connected to the housing and has a surface which communicates with the second stage chamber. An outlet port is provided from the second stage chamber.

More particularly each stage of the regulator includes a cylindrical pressure chamber having a valued entrance therein in fluid communication with a high pressure source. One end wall of each of the pressure chambers comprises an inherently resilient diaphragm which is rigidly connected to the chamber side walls and to a valve stem. The valve stem extends through a valve seat which forms the other end of each of the chambers. A valve head is mounted on the end of each valve stem protruding from the chambers. The diaphragms normally bias the valve heads out of sealing relationship with the valve seats so that the entrance into each pressure chamber is open. When the pressure in either of the pressure chambers exceeds a predetermined value, which may be set by adjusting the distance of the valve head from its seat, the diaphragm is forced outwardly against its inherent biasing force thereby pulling the valve head into sealing relationship with the seat and closing the entrance to the chamber. The only movable parts in each stage of the two stage regulator thus comprise the lightweight inherently resilient diaphragm and the valve member.

The ability of the two stage regulator of this invention to withstand high impact is increased in two ways. Since the only movable elements of each pressure chamber comprise the valve member and the diaphragm, the total mass and the momentum on impact are much lower than prior art regulators. Since the diaphragms are fixedly attached to the regulator housing and to the valve stem and no biasing coil springs are employed, at impact there can be no misalignment of the movable parts of the regulator.

Description of preferred embodiment

Figure 2:
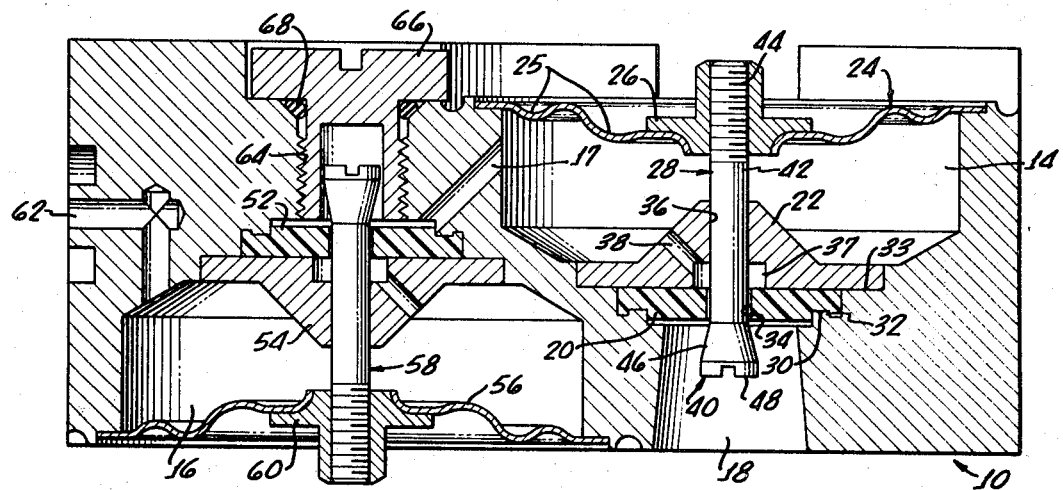

A better understanding of this invention may be had from the following description of the preferred embodiment as shown in the accompanying drawings wherein:
FIG. 1 is a plan view of a two stage pressure regulator constructed in accordance with this invention; and
FIG. 2 is a transverse sectional view of the pressure regulator taken substantially along line 2—2 of FIG. 1.
As shown in FIG. 1, the pressure regulator of this invention comprises a housing 10 having apertured brackets 12 thereon for mounting the regulator. As shown in FIG. 2, the housing 10 encloses two open ended cylindrical pressure chambers 14 and 16 joined by a passage 17. The first stage pressure chamber 14 is in fluid communication with a high pressure, smaller diameter inlet passage 18 in the housing. The chamber 14 is enclosed by means of an annular valve seat 20, an annular valve guide 22, an annular diaphragm 24, a flanged retaining nut 26 and a valve member 28 which is adapted to move into sealing relationship with the seat 20.

The valve seat 20 is preferably constructed of a resilient, impermeable material such as Teflon or Mylar. An annular groove 30 is provided on the valve seat for snapping it into position on a mating tongue 32 on the housing. The valve seat 20 is maintained in fluid tight relationship with the housing 10 by means of the valve guide 22 which may be press-fitted, welded, or otherwise fixedly mounted on an annular step 33 in the housing 10 as shown in FIG. 2. The seat 20 and guide 22 carry aligned central bores 34 and 36 respectively. The bore 36 of the guide 22 is stepped with the larger diameter portion 37 being adjacent to the seat 20 and communicating with the chamber 14 through an inlet port 38 in the guide 22.

The valve member 28 comprises a valve head 40, a valve stem 42, and a threaded end portion 44. As shown in FIG. 2, the valve head 40 includes a conical seat engaging surface 46 and a slotted cylindrical end portion 48. The valve stem 42 passes through apertures 34 and 36 in the valve seat and the valve guide and the threaded end portion 44 is threadedly engaged in a fluid tight manner in the retaining nut 26. The threaded connection may be maintained fluid tight by use of an appropriate sealant or thread structure.

The diaphragm 24 is a thin centrally apertured disc of a lightweight inherently resilient material. Stainless steel has been found to have a good strength to weight ratio and resiliency for use as the diaphragm. For example, the diaphragm may be stamped from thin gage AISI Type Nos. 420 or 440A stainless steel or other instrument type stainless steel.

The diaphragm is provided with concentric annular stepped reinforcing grooves 25 for added resilience and strength. The combined weight of the diaphragm 24, the retaining nut 26 and the valve member 28 is maintained at a minimum by welding the diaphragm 24 to the housing 10 and to the retaining nut 26 in a fluid tight weld e.g. in the helium arc process. In this manner the diaphragm 24, the retaining nut 26 and the valve member 28 form a single lightweight unitary movable member integrally connected to the housing 10.

The second stage pressure reduction chamber 16 is formed in substantially the same manner as the first stage chamber 14. The chamber 16 is provided with a resilient valve seat 52, a valve guide 54, a diaphragm 56, a threaded valve member 58 and a flanged valve member retaining nut 60. The pressure chamber 16 is also in fluid communication with an outlet port 62. A threaded bore 64 communicates with the passage 17 and atmosphere, as shown in FIG. 2, and the bore 64 is sealed by means of a hollow threaded screw plug 66 and an O-ring 68. When fully advanced in the threaded bore 64, the screw plug 66 compresses the O-ring 68 into fluid tight relationship with the housing. The screw plug 66 also fits about the valve member 58 for protecting it from accidental misadjustment and for properly aligning the valve member during operation and at impact.

The diaphragm 56 is of similar configuration to the diaphragm 24 and may be constructed of the same type materials for welding to the housing and the retaining nut. The diaphragm 56, however, is made more flexible and more pressure sensitive than the diaphragm 24, as by using a thinner gauge material, so that the biasing force of the diaphragm 56 is lower than that of the diaphragm 24.

In operation of the high impact resistant pressure regulator of this invention, the valve head 40 is unseated from the valve seat 20 by the inherent biasing force of the diaphragm 24. A high pressure fluid is admitted into the pressure chamber 14 through the inlet 18, the bore 34 the enlarged portion 37 of bore 36, and the port 38. As the pressure in the chamber 14 builds up to a pressure which overcomes the biasing force of the diaphragm 24, the diaphragm is forced outwardly against its inherent biasing force to pull the conical surface 46 of the valve 28 into sealing engagement with the seat 20, thereby interrupting fluid flow into the chamber 14. When the pressure in the chamber 14 is reduced below the inherent biasing force of the diaphragm 24, due to flow of fluid from the chamber 14 through the outlet port 17 into the chamber 16, the conical surface 46 of the valve head 40 is again forced out of sealing relation with the seat 20 by the resilience of the diaphragm 24 to permit additional high pressure fluid to flow into the first stage chamber. In this manner, the pressure of fluid flowing in the chamber 14 is reduced to a predetermined level corresponding to the inherent biasing force of the diaphragm 24.

The fluids leaving the chamber 14 through the outlet port 17 enter the pressure chamber 16 through the respective bores and ports in the valve seat 52 and the valve guide 54.

The pressure regulating valve mechanism of the chamber 16 operates substantially the same as that described with respect to the chamber 14. When the biasing force of the diaphragm 56 is overcome by the pressure of fluids in the chamber 16, the diaphragm is forced away from the seat 52 thereby pulling the valve member 58 into fluid tight relationship with the valve seat. The diaphragm 56, as previously explained, has a lower biasing force than the diaphragm 24 and thus closes the valve 58 in response to a lower pressure in the second stage chamber 16. Thus the pressure of fluids in the second stage chamber 16 and exiting through exhaust port 62 is significantly less than the pressure of the fluids in the first stage chamber 14, in the inlet 18 and exiting through passage 17 into chamber 16. Fluid flow through the first and second stage pressure chambers may be regulated by threadedly adjusting the position of the valve member in its respective retaining nut. For example, the position of valve member 28 may be threadedly adjusted by the use of a screwdriver in the slotted end of the valve head 40.

The regulator, as described, has been found to be capable of handling input pressures from 200 to 2000 p.si.g. Diaphragm 24, accordingly, is preferably set to seat valve head 40 at a pressure of between 100 and 150 p.s.i.g. and diaphragm 56 is preferably constructed to seat valve 58 at a pressure of about 80 p.s.i.g. Any desired pressure settings may be used, however.

The high impact regulator of this invention has been found to be capable of withstanding an impact of 15,000 g. for a period of 2 milliseconds without damage to either the movable or stationary portions of the valve mechanisms and pressure chambers. Since the regulator housing, the diaphragm and the valve member in each chamber are all integrally connected by weldments and screw threads into unitary movable portions, the regulator is able to withstand these extreme impact pressures without danger of misalignment or damage caused by the movable members. Additionally by the use of inherently resilient diaphragms in the place of the coil springs, the masses of the movable portions of the regulator have been maintained exceptionally small for the amount of pressure reduction attained and the potential for doing damage at impact has been greatly reduced.

While a preferred embodiment of the improved regulator has been disclosed in detail, the scope of the invention is intended to be limited only by the appended claims.

What is claimed is:

1. A two stage impact resistant pressure regulator comprising:
   a regulator housing;
   a first pressure chamber defined in said housing;
   an inlet port defined in said housing communicating with said first chamber and adapted to communicate with a source of high pressure fluid;
   means for interrupting fluid flow into said first pressure chamber when the pressure in said chamber exceeds a predetermined level, said interrupting means including means defining a valve seat aligned in coaxial alignment with said inlet port, a first valve member adapted to be seated in said seat for sealing said inlet port, and a first resilient diaphragm characterized by a first biasing force connected with said valve member and adapted to apply a first valve unseating first pressure to said valve member integrally connected to said housing and having a surface thereof communicating with said chamber;
   a second pressure chamber in said housing communicating with said first chamber;
   means for interrupting fluid flow from said first chamber into said second chamber when the pressure in said second chamber exceeds a predetermined level including means defining a second valve seat disposed between said first and second pressure chambers, a second valve member adapted to be seated in said second valve seat for interrupting communication between said first and second chambers, and a second resilient diaphragm characterized by a second biasing force connected with said second valve member adapted to apply a valve unseating second pressure relatively lower than said first pressure to said second valve member for establishing communication between said chambers integrally connected to said housing and having a surface thereof in fluid communication with said second chamber; and an outlet port communicating with said second pressure chamber.

2. A two stage impact resistant pressure regulator comprising:
(A) a regulator housing;
(B) means defining a first pressure chamber within said regulator housing;
(C) an inlet port defined in said housing communicating with said first pressure chamber and adapted to communicate with a source of high pressure fluid for establishing a pressurized flow of fluid into said first chamber;
(D) a first interrupting means for interrupting an established flow of fluid into said first pressure chamber when the pressure in said first chamber exceeds a predetermined level, said interrupting means including:
 (1) a bored valve seat mounted in said first chamber adjacent said inlet port;
 (2) a bored valve guide member mounted in said first chamber disposed adjacent to said valve seat in coaxial alignment therewith and connected to said housing for retaining the valve seat in fixed position in said housing;
 (3) a biasing means comprising a centrally bored resilient disc including concentric corrugations formed therein, said disc being integrally connected with said housing and forming one wall of said first chamber; and
 (4) an elongated valve member including means defining a valve seat at one end thereof, projected into said inlet port a body extending from the head through said valve seat and said valve guide member, whereby alignment of said valve member is caused to be maintained and said valve head is caused to project into said inlet port, and a screw-threaded opposite end portion extending into the bore of said resilient disc;
(E) a first screw-threaded retainer nut connected with said first resilient disc and disposed about the bore at the central portion thereof for adjustably receiving and retaining said opposite end of said first valve member;
(F) means defining a second pressure chamber communicating with said first chamber in said housing, whereby a flow of fluid may be established therebetween;
(G) a second interrupting means for interrupting a flow of fluid from said first chamber into said second chamber when the pressure in said second chamber achieves a predetermined level comprising a second valve mechanism disposed in said second chamber including:
 (1) a bored valve seat;
 (2) a bored valve guide mounted in said housing adjacent said valve seat;
 (3) a centrally bored resilient disc having concentric corrugations formed therein, said disc being integrally connected with said housing and forming one wall of said second pressure chamber; and
 (4) an elongated valve member including means defining a valve head at one end thereof projected outwardly from said second chamber, a valve body extending through said valve seat and said valve guide member whereby alignment of said valve member is caused to be maintained, and said valve head is caused to project outwardly from said valve seat, and a screw-threaded opposite end portion extending into the bore of the resilient disc;
(H) a second screw-threaded retainer nut integrally connected with the disc of the second valve mechanism and disposed about the bore at the central portion thereof for adjustably receiving and retaining said opposite end of valve member of said second valve mechanism;
(I) means comprising a hollow plug defining a valve head path therein adapted to maintain said head in proper alignment; and
(J) an outlet port communicating with said second chamber adapted to discharge fluid from said regulator.

References Cited
UNITED STATES PATENTS

| | | | |
|---|---|---|---|
| 183,935 | 10/1876 | Kayser | 137—505.41 |
| 1,181,010 | 4/1916 | Hoyt | 137—505.41 |
| 2,961,165 | 11/1960 | Whitenock | 92—103 |
| 3,004,548 | 10/1961 | Jones | 137—505.12 XR |
| 3,260,278 | 7/1966 | Lund | 137—505.12 XR |

HAROLD W. WEAKLEY, *Primary Examiner.*

U.S. Cl. X.R.

92—103; 137—315, 505.41